United States Patent [19]
Mojelski

[11] 3,879,814
[45] Apr. 29, 1975

[54] CLAMP

[75] Inventor: William Mojelski, Grand Forks, British Columbia, Grand Forks, British Columbia, Canada

[73] Assignee: Mo Clamp Co. Ltd., Delta, British Columbia, Canada

[22] Filed: Feb. 25, 1974

[21] Appl. No.: 445,168

[52] U.S. Cl............................ 24/248 C; 24/248 F
[51] Int. Cl............................................. A44b 21/00
[58] Field of Search......... 24/132 WL, 242, 248 FS, 24/248 F, 243 FS, 248 C

[56] References Cited
UNITED STATES PATENTS
| | | | |
|---|---|---|---|
| 66,892 | 7/1867 | Rowley | 24/248 F UX |
| 680,322 | 8/1901 | Faust | 24/248 C UX |
| 902,795 | 11/1908 | Appleton | 24/248 F UX |
| 2,659,609 | 11/1953 | Johnson | 24/248 C X |

FOREIGN PATENTS OR APPLICATIONS
1,827   5/1877   United Kingdom............... 24/248 C

*Primary Examiner*—Donald A. Griffin
*Attorney, Agent, or Firm*—Carver and Company

[57] ABSTRACT

A clamp having a pair of elongated, crossed clamping parts crossed on a pivotal axis for swinging movement above said axis and rocking movement about a transverse axis. The parts have camming members on lever portions thereof which co-act and spread the lever portions and move clamping jaws into engagement when the parts are swung about the pivotal axis from an angularly disposed position to a position of substantial parallelism.

3 Claims, 4 Drawing Figures

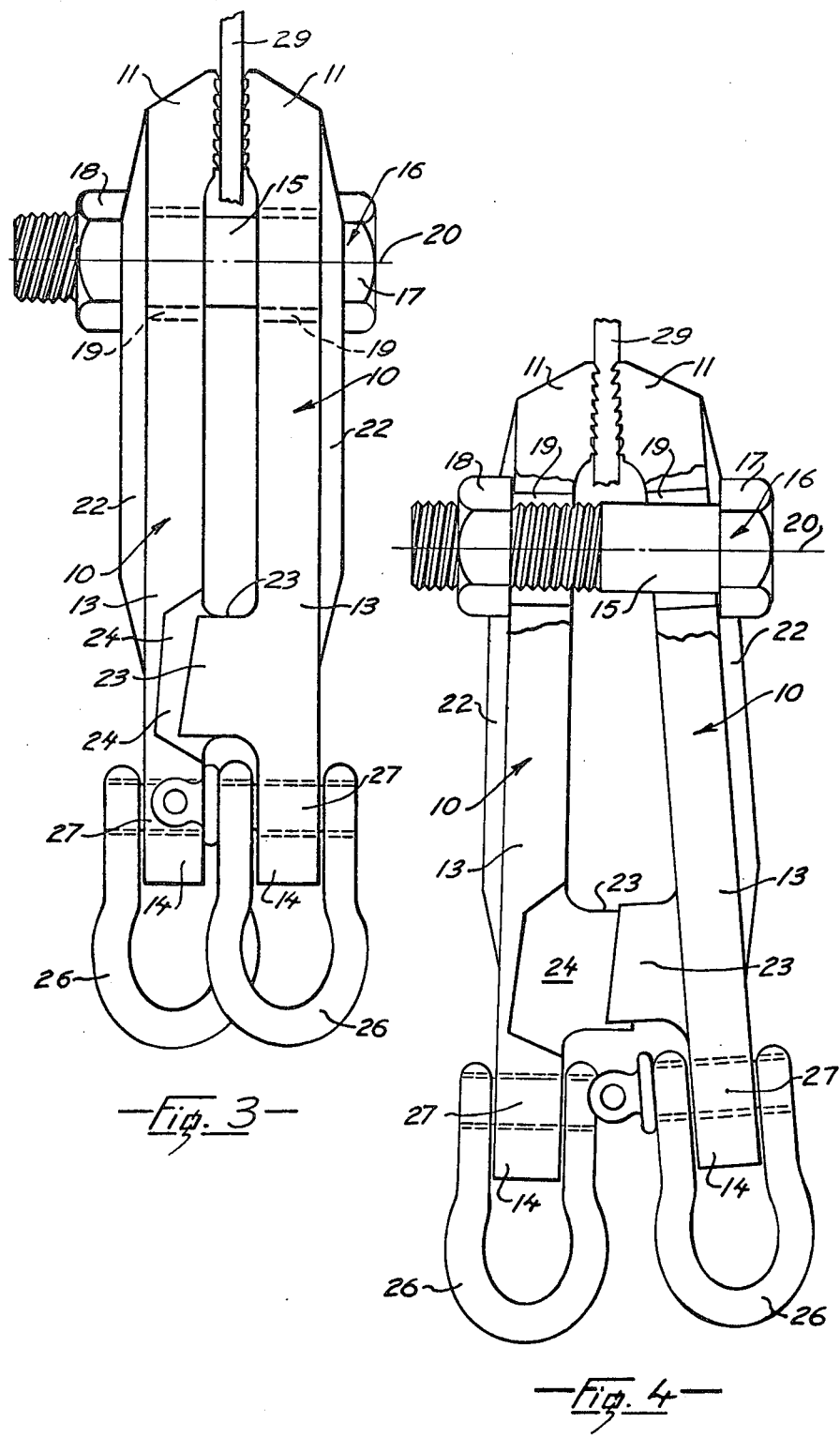

CLAMP

BACKGROUND OF THE INVENTION

1. Field of the Invention

This invention relates generally to clamps and in particular to clamps which are used in the repair of automobile bodies.

2. Prior Art

In the repair of automobiles, particularly in the straightening of frames and the like, it is usually necessary to use jacks which are secured in one way or another to the frame members and which are then operated to straighten the frame members. Clamps or hooks are, conventionally, used to secure the jacks to the frame.

Conventionally, clamps used for this purpose usually have a pair of ribbed jaws which are clamped to a frame member by means of bolts or the like which require the use of wrenches to enable them to be tightened into gripping engagement with the frame member. As forces exerted by jacks, which are normally of the hydraulic type, are of a high order, unless clamping pressure is sufficient, clamps tend to slip. This is a problem inherent in the type of clamp above mentioned and as gripping pressure does not increase with increased force applied by the jack.

SUMMARY OF THE INVENTION

The present invention provides a clamp for the purposes of the above which does not require the use of tools for obtaining initial purchase and is so constructed so as to result in a gripping pressure which increases correponding to the force applied by the jack.

Further, the clamp of the present invention obtains its grip by a scissoring effect as it is tightened so that gripping teeth on the gripping surfaces of the clamp bite into a work piece the enhance the grip thereon.

The clamp of the present invention is also relatively inexpensive to produce and is easy to apply.

The clamp of the present invention has a pair of elongated crossed clamping parts which have a loose pivotal connection for movement about a pivotal axis and a limited rocking movement about a transverse axis. The parts have jaws having planar, parallel gripping surfaces at one end and opposite ends of the clamping parts have lever portions. The lever portions have co-acting cam members which, when the lever portions are swung from a crossed position to a position of substantial parallelism, co-act with each other to spread the lever portions apart and swing the gripping surfaces into gripping engagement with the work piece.

A detailed description following, related to the drawings, gives exemplification of apparatus according to the invention which, however, is capable of expression in means other than those particularly described and illustrated.

DESCRIPTION OF THE DRAWINGS

FIG. 3 is an end elevation of the clamp in an open position adjusted to have initial purchase on a work piece.

FIG. 4 is a view similar to FIG. 3 of the clamp in a closed position.

Detailed Description

Figure 1:
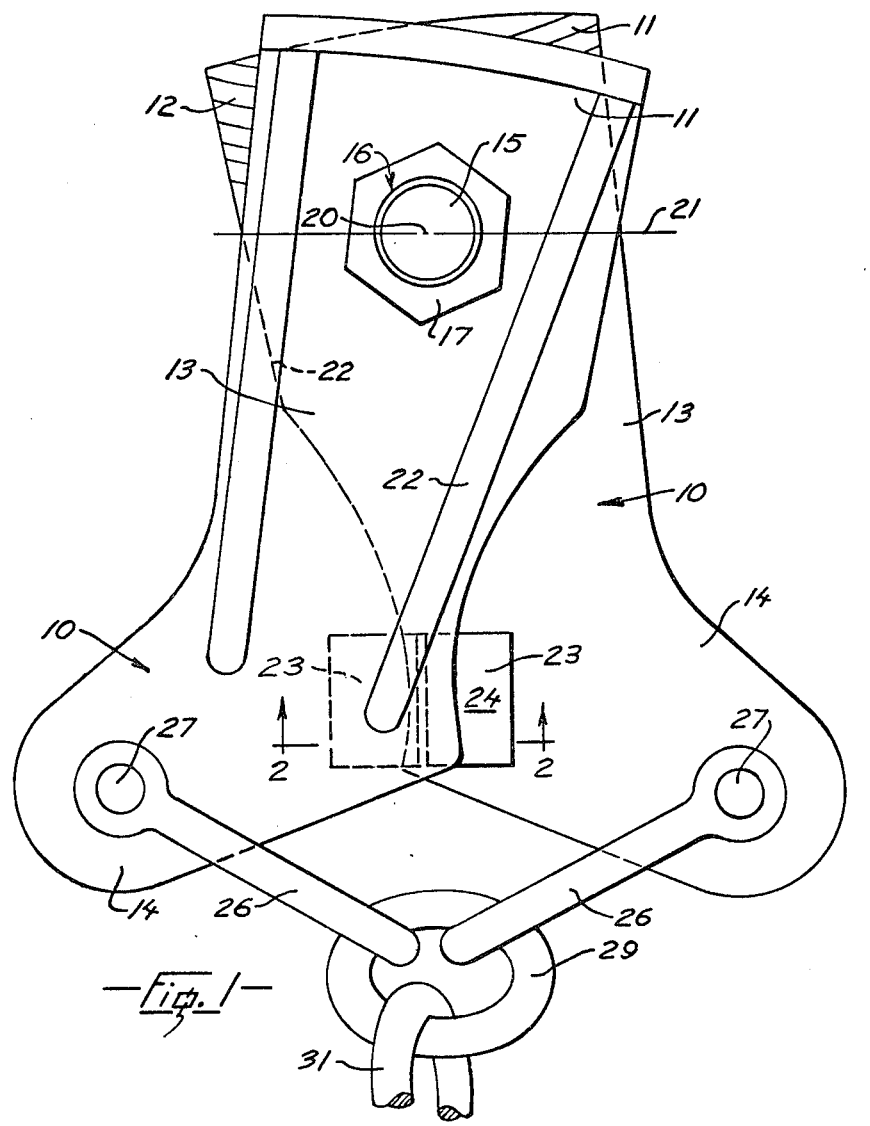
FIG. 1 is a side elevation of the clamp, in accordance with the invention, in an open position.
Figure 2:
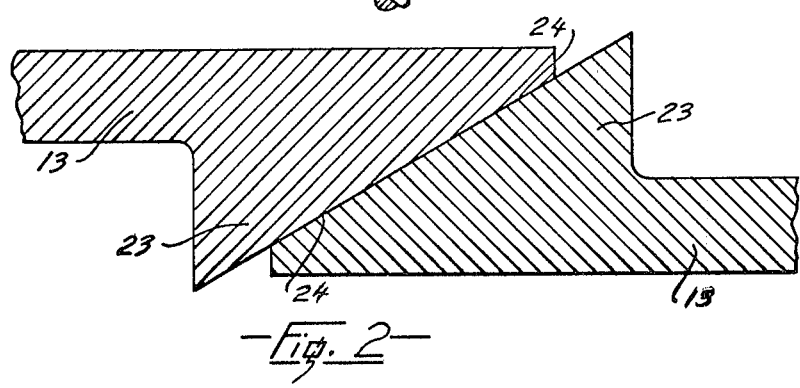
FIG. 2 is an enlarged section view of 2—2 of FIG. 1.

Referring to the drawings a clamp has a pair of elongated clamping parts 10—10 which are mirror images of each other and which have a jaw portion 11—11 having flat parallel, planar ribbed faces 12—12 and elongated lever portions 13—13. Each of the lever portions terminate in lateral extensions 14—14.

The clamping parts are mounted on the shank 15 of a bolt 16 which has a head 17 bearing against an outer face of one of the calmaping parts and a nut 18 threaded on the opposite end of the bolt which bears against the outer face of the other of the clamping parts. The clamping parts are provided with holes 19—19 which are larger in diameter than the shank of the bolt so that the parts can pivot freely on the axis 20 of the bolt and also rock relative to each other on a transverse axis 21, see FIG. 1. Each of the clamping parts has longitudinally extending stiffening ribs, severally 22, extending along their outer faces.

The lever portions have camming members 23—23 which extend as projections from the inner faces of said parts. The camming members have sloped camming faces 24—24 which are adapted to make slideable contact with each other when the parts are swung from an angularly disposed position as shown in FIG. 1 to a position of substantial parallelism.

Clevises 26—26 are swingably mounted on pins 27—27 extending transversely through the lateral extensions of the lever portions and are engaged with a ring 29 to which a tensioning chain 31, shown only partially, is secured. The tensioning chain can be connected to a jack or the like, not shown.

In operation, the jaw portions of the clamp are fitted to a frame member 29 of an automobile with the clamping parts in an angularly disposed position as shown in FIG. 1 and with the camming surfaces of the camming members in engagement with each other.

The nut 18 is then finger tightened down against its associated clamping part so that the jaw faces obtain an initial purchase on the frame member as seen in FIG. 3. When the chain is tensioned by operation of its jack, the parts are swung from a position of angularity towards a position of substantial parallelism about the pivotal axis 20 of the bolt. This results in sliding engagement of the camming surfaces of the camming member which consequently spreads the lever portions apart and moves the gripping surfaces of the jaws towards each other so that the ribbed gripping surfaces bite into the frame member, see FIG. 4, thus enhancing the grip of the clamp.

It is obvious that any increase in chain tension results in the corresponding increase in gripping pressure. Further gripping pressure is also enhanced due to relative rotation of the gripping surface which increases the bite into the frame member.

The clamp is simple to remove as decrease in chain tension will automatically result in decrease of gripping pressure so that parts can be rotated by hand to their position of angularity and the clamp removed from the frame member without the use of any tools.

I claim:

1. A clamp comprising:
   a. a pair of elongated clamping parts disposed in crossed relationship on a pivotal axis,
   b. each of the clamping parts having, at one end, clamping jaws presenting parallel, planar clamping faces normal to the pivotal axis and, at an opposite end, elongated lever portions, c. connecting means connecting the clamping parts at the pivotal axis for pivotal movement about said axis between a position of angularity and a position of substantial parallelism and for rocking movement about a transverse axis, d. projections extending from inner surfaces of the clamping parts, the projections having sloped camming faces adapted for mutual camming engagement when the parts are swung from the position of angularity to a position of substantial parallelism, for spreading the lever portions apart so as to move the clamping jaws into gripping engagement with a work piece.

2. A clamp as claimed in claim 1 in which the clamping parts have openings on the pivotal axis and in which the connecting means comprises a bolt having a shank having a loose fit through the openings and having a head on one end bearing against one of the clamping parts and a nut threaded on an opposite end adapted to be tightened against the other of the clamping parts.

3. A clamp as claimed in claim 1 in which the lever portions terminate in lateral extensions, and including a clevis swingably connected to each lateral extension for connection to a link of a chain.

* * * * *